(No Model.)

J. FARRELL.
KETTLE FOR MAKING DROP SHOT.

No. 259,120. Patented June 6, 1882.

Witnesses
Ed Parker
R. H. Whittlesey

Inventor
John Farrell
by George H. Christy
his Atty.

UNITED STATES PATENT OFFICE.

JOHN FARRELL, OF PITTSBURG, PENNSYLVANIA.

KETTLE FOR MAKING DROP-SHOT.

SPECIFICATION forming part of Letters Patent No. 259,120, dated June 6, 1882.

Application filed May 1, 1882. (No model.)

*To all whom it may concern:*

Be it known that I, JOHN FARRELL, a citizen of the United States, residing at Pittsburg, county of Allegheny, State of Pennsylvania, have invented or discovered a new and useful Improvement in Kettles for Making Drop-Shot; and I do hereby declare the following to be a full, clear, concise, and exact description thereof, reference being had to the accompanying drawings, making a part of this specification, in which—like letters indicating like parts—

Figure 1:
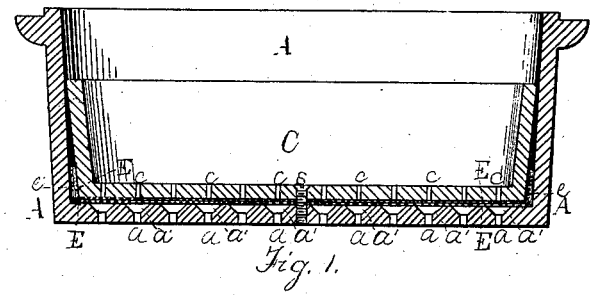
Figure 2:
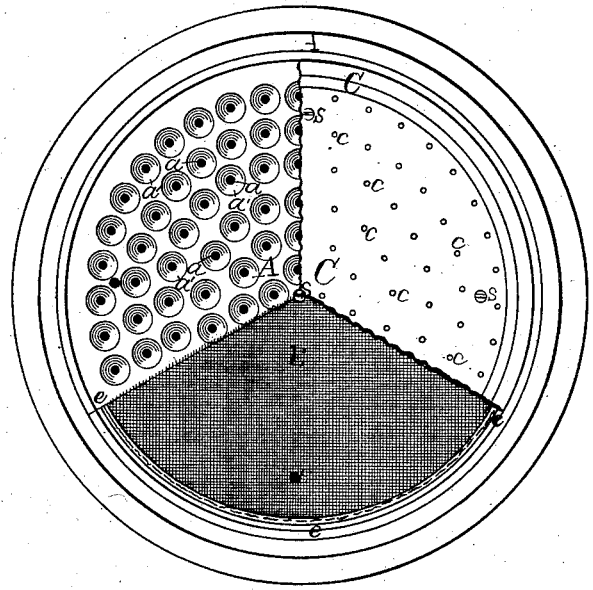
Figure 3:
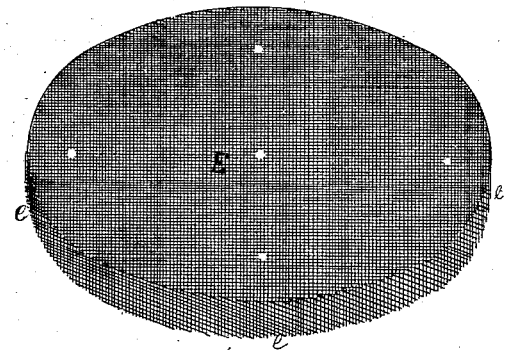
Figure 4:
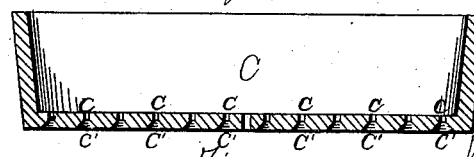

Figure 1 is a vertical sectional view of my improved drop-shot kettle. Fig. 2 is a top plan view, showing a part of the inner pan and regulating-screen broken away. Fig. 3 is a perspective view of a fine wire screen illustrative of that used in the kettle; and Fig. 4 is a vertical sectional view of the inner pan, showing a modified form of perforations in its bottom.

My invention relates to certain improvements in kettles for making drop-shot; and it consists in the construction and combination of a kettle having a perforated bottom, an inner pan having also a perforated bottom, and one or more fine wire screens between such perforated bottoms, as hereinafter more fully described and claimed.

In the drawings, A represents a kettle, made by preference of iron, and having through its bottom a number of perforations, $a$, which expand or increase in size toward the inner face of the bottom in the form of conical or countersunk enlargements, $a'$. The purpose of this form of perforation or passage will presently appear.

Inside the kettle is a vertically-removable pan, C, of iron or other suitable metal, through the bottom of which are made a number of perforations, $c$, which are by preference so arranged that by properly adjusting the pan they may be brought in line with the perforations $a$, or directly over the countersunk enlargements $a'$. In order to do this conveniently, I have arranged the perforations in both the kettle and pan in concentric circles at uniform intervals and corresponding circles of equal diameter. This arrangement is adopted simply for convenience, however, and any other order or arrangement may be made which will secure substantially the desired alignment of perforations. The size and number of perforations will be determined by the size or grade of shot desired, and can readily be determined by the mechanic.

Between the pan and kettle bottoms are one, two, or more fine woven-wire or wire-cloth screens, E. These screens are made of a circular piece of the material named, having a little larger diameter than the inside of the kettle, so that the periphery will be flanged or cupped upward around the bottom of the pan, as at $e$. Such flanges may be omitted, however. They are employed principally for convenience and to prevent, in a great measure, the flow of lead outside of the periphery of the pan. These screens E and the bottom of pan C are bound tightly upon the inner face of the kettle-bottom by screws $s$, or equivalent bolts, in any desired number.

The function or purpose of the screen or screens E is to arrest or retard the flow of lead through the perforations, or from the perforations above to the perforations below. Owing to the slightly-roughened or woven surface of the screens, minute passages will be formed between the bottom of pan C and the surface of the screen immediately under it, thus permitting the lead to spread out over the surface of the screen and slowly percolate or filter through its fine meshes in very minute quantities or globules, which will reunite on the under surface of the screen, and either fall therefrom in drops into the contracting passage $a'$ or will be conducted downward by the converging walls of such passages into the smaller opening, $a$, where, owing to the retardation in flow caused by the diminished outlet, the lead will form in drops and fall to the cooling-tank below. In this operation the countersunk or conical part of the passages $a'$ perform a useful and important function in gathering lead from a comparatively large surface on the under face of the screen and retarding the flow, thus assisting in the formation of the drops at the under face of the kettle.

If the perforations were of one diameter throughout or cylindrical, the drops would form at the upper ends or on the inner face of the kettle, in which case they would be smaller than the perforations, and also liable to vary in size; but in the form of perforation shown the drops will be formed at the lower end or on the outer face of the bottom. They will be of the full size of the perforations and much more uniform in size. This I consider an important feature of improvement in drop-shot kettles.

One screen E, if very fine and strong, may be used between the pan and kettle bottoms with good results; but ordinarily I prefer to use two or more screens placed together, one upon another, as illustrated in Fig. 1, whereby passage through them is rendered more intricate, and consequently the flow of lead is retarded to a greater degree and made more uniform under varying quantities of molten lead in the pan above, which may be ladled into or out of the pan at pleasure without affecting injuriously the rate of flow through the screens.

In order to facilitate a uniform spread of lead over the upper surface of the screens, the perforations $c$ in the pan may be countersunk from the under or outer side, as represented at $c'$, Fig. 4, thus allowing the lead to flow onto a considerable part of the surface of the screen; but, as before described, the lead will spread somewhat over the surface without the enlargements $c'$; also, if the perforations below the screen be made without the enlargements $a'$, the lead will find its way thereto between the under face of the screen and the kettle-bottom, owing, as before described, to the roughened or woven surface of the screen. I prefer, however, to retain the upwardly-enlarging form of passage $a$ $a'$ in the kettle-bottom, as much better results are secured thereby.

Molten lead will flow almost with the freedom of quicksilver, and will pass readily through openings too small for the passage of water, and it has been found difficult in practice to make artificial passages which would sufficiently retard the flow of lead to form it into drops.

In attempting to secure this result perforated plates have been used with the perforations alternating or out of line, so that the lead must find its way between two close-fitting plate-surfaces, and thus its flow be retarded. In such kettles, however, the flow of lead is sensitive to and injuriously affected by material changes in the temperature of the kettle and the amount of lead maintained therein; and there is also danger of clogging the tortuous lead-passage by lead chilling therein.

I have found it much better and productive of better results to employ filtering-screens, as herein described, making the discharge-passage straight, or nearly so, and depending upon the retarding effect of the screens to secure the desired rate of flow. In this way the difficulties noted are obviated. Such regulating-screens also give better results than the lead-dross packing commonly employed heretofore, as they secure a more uniform flow, and require but a small fraction of the time and skill necessary to properly prepare a dross packing. Either a dross or a plate filter or retarding mechanism may be used, however, with a kettle having the inwardly-enlarged perforations $a$ $a'$ and better results be secured than with a kettle having the ordinary form of perforations; but, for the reasons above given, I prefer the regulating or filtering mechanism shown in the drawings.

For making shot of different grades or sizes I prefer to employ kettles having perforations of corresponding sizes, though within certain limits sizes may be varied by increasing or diminishing the number of regulating-screens E, or by using screens of different grades of fineness or size of mesh.

I claim herein as my invention—

1. A drop-shot kettle having perforations through its bottom which are countersunk or conically enlarged on the inner side of the bottom, in combination with a filter or regulating mechanism within the kettle for retarding the flow of lead to such perforations, substantially as and for the purposes set forth.

2. The combination of a kettle having a perforated bottom, an inner pan also having a perforated bottom, and one or more fine woven-wire screens between the pan and kettle bottoms for retarding and regulating the flow of lead from the perforations above to those below, substantially as set forth.

3. The kettle A, having perforations $a$ in its bottom, which open into the kettle in conical or countersunk enlargements $a'$, in combination with one or more fine woven-wire screens, E, on the inner face of the kettle-bottom, and perforated pan C, bound tightly upon the screens and kettle-bottom, substantially as set forth.

4. A kettle, A, having a perforated bottom, an inner pan, C, having a perforated bottom, the perforations in both bottoms being in line, and one or more fine woven-wire screens, E, between the two bottoms, substantially as and for the purposes set forth.

In testimony whereof I have hereunto set my hand.

JOHN FARRELL.

Witnesses:
R. H. WHITTLESEY,
C. L. PARKER.